United States Patent [19]

Flugger

[11] Patent Number: 5,351,481
[45] Date of Patent: Oct. 4, 1994

[54] MUFFLER ASSEMBLY WITH BALANCED CHAMBER AND METHOD

[75] Inventor: Ray T. Flugger, Foresville, Calif.

[73] Assignee: Flowmaster, Inc., Santa Rosa, Calif.

[21] Appl. No.: 904,645

[22] Filed: Jun. 26, 1992

[51] Int. Cl.⁵ .................. F01N 7/10; F02B 27/04
[52] U.S. Cl. ........................ 60/273; 60/313; 60/323; 181/238; 181/240
[58] Field of Search ............ 60/323, 273, 313; 181/238, 239, 240

[56] References Cited

U.S. PATENT DOCUMENTS

| | | |
|---|---|---|
| 624,062 | 5/1899 | Mattews et al. |
| 1,081,348 | 12/1913 | Unke . |
| 1,184,431 | 5/1916 | Dodge . |
| 2,000,722 | 5/1935 | Steward .................. 60/323 |
| 2,071,351 | 2/1937 | McNamara . |
| 2,239,549 | 4/1941 | Chipley . |
| 2,325,905 | 8/1943 | Caulfield . |
| 2,370,259 | 2/1945 | Rippingille .............. 181/238 |
| 2,485,555 | 10/1949 | Bester . |
| 2,667,940 | 2/1954 | Gallihugh . |
| 4,574,914 | 3/1986 | Flugger . |
| 4,621,494 | 11/1986 | Fujita .................. 181/240 |
| 5,123,502 | 6/1992 | Flugger . |

FOREIGN PATENT DOCUMENTS

| | | | |
|---|---|---|---|
| 523 | 1/1984 | Japan ......................... | 60/323 |
| 32920 | 2/1985 | Japan ......................... | 60/323 |
| 285604 | 2/1928 | United Kingdom . | |

*Primary Examiner*—Douglas Hart
*Attorney, Agent, or Firm*—Flehr, Hohbach, Test, Albritton & Herbert

[57] ABSTRACT

A compact, high performance exhaust assembly (50) for an internal combustion engine (20) or the like having a balanced chamber (52). Two substantially parallel inlet exhaust pipes (38, 40) are mounted to a first wall (74) of the chamber (52) and are axially aligned with, but independent of, two output exhaust pipes (54, 56) similarly mounted to a opposing second wall (76) of the chamber (52). Exhaust gas is discharged through the inlet pipes (38, 40), preferably in an out-of-phase relationship or alternating from one inlet pipe to the other. The exhaust gas passes a short distance through the chamber (52) and out of aligned outlet pipes (54, 56). The majority of the exhaust gas flows directly through the chamber (52) without significant expansion. The exhaust assembly (50) increases the power output of the engine.

16 Claims, 5 Drawing Sheets

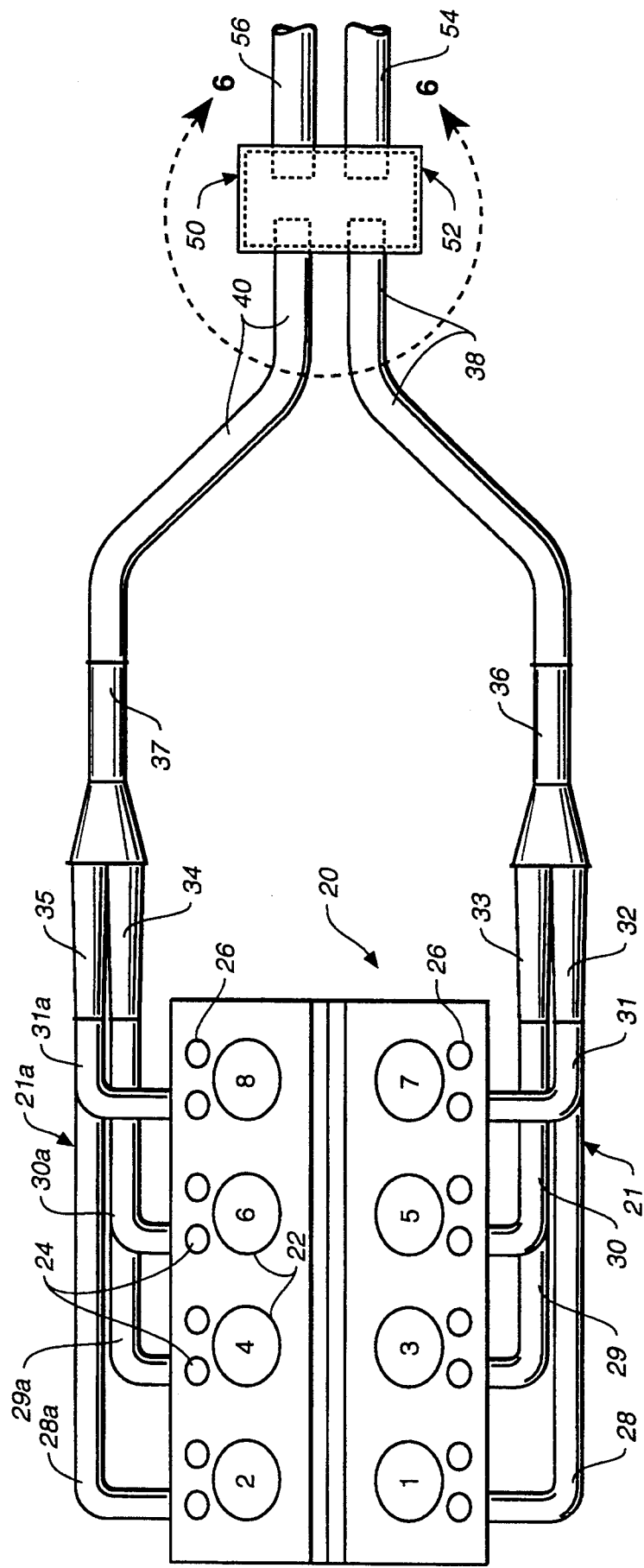
FIG._1

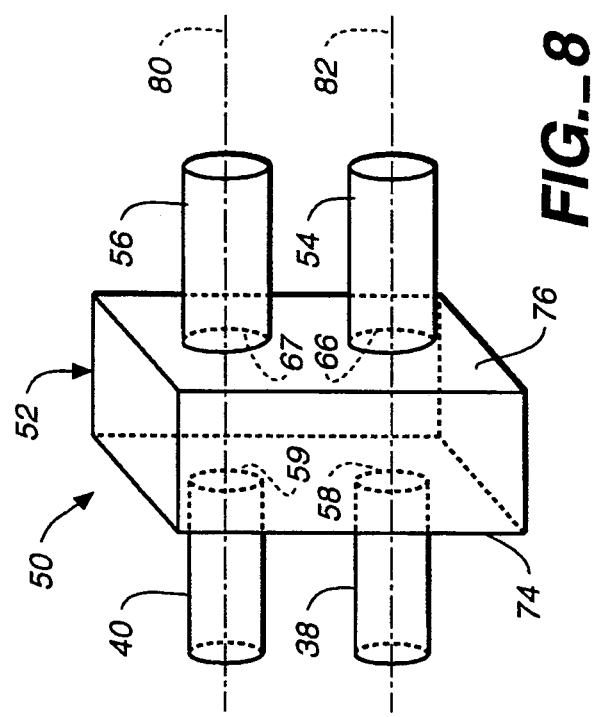
FIG._8
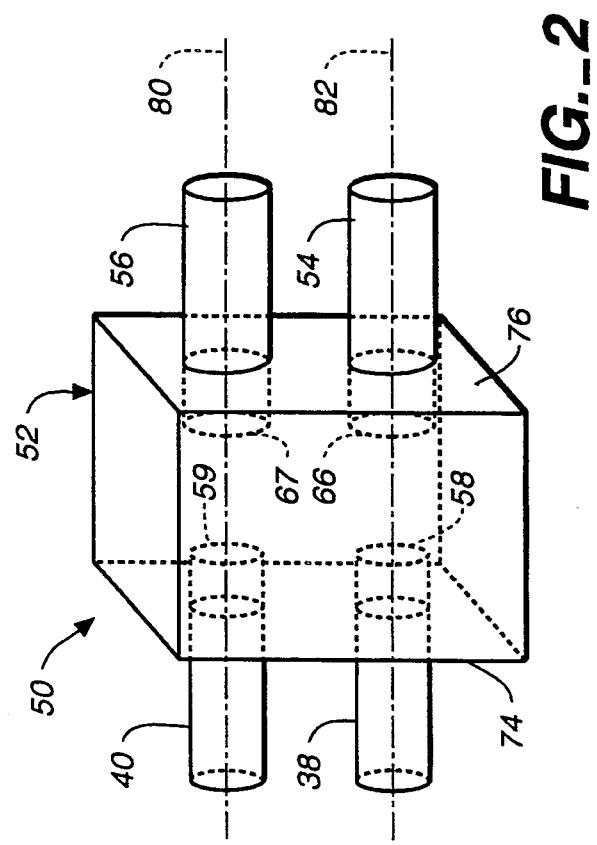
FIG._2

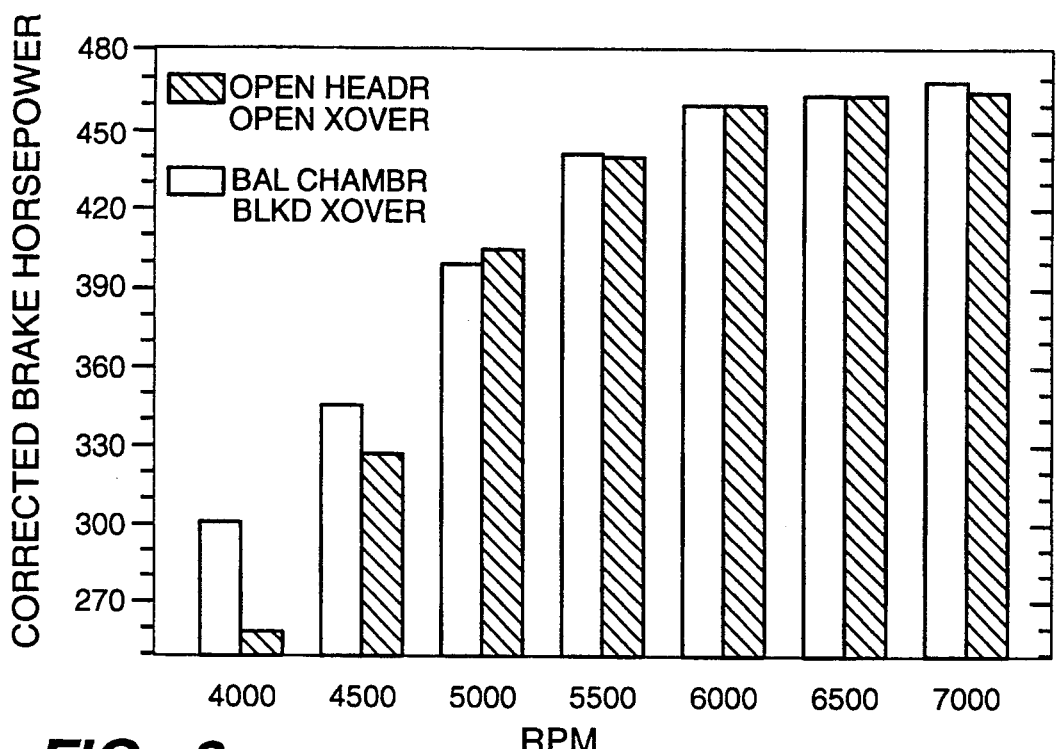
FIG._3
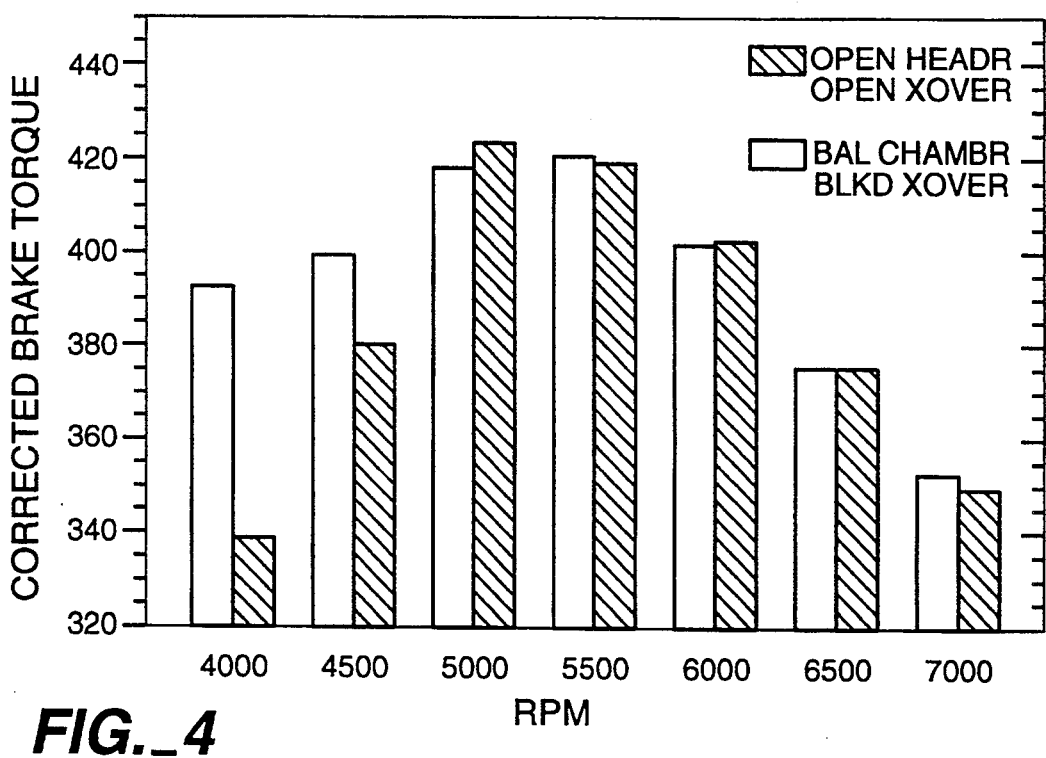
FIG._4

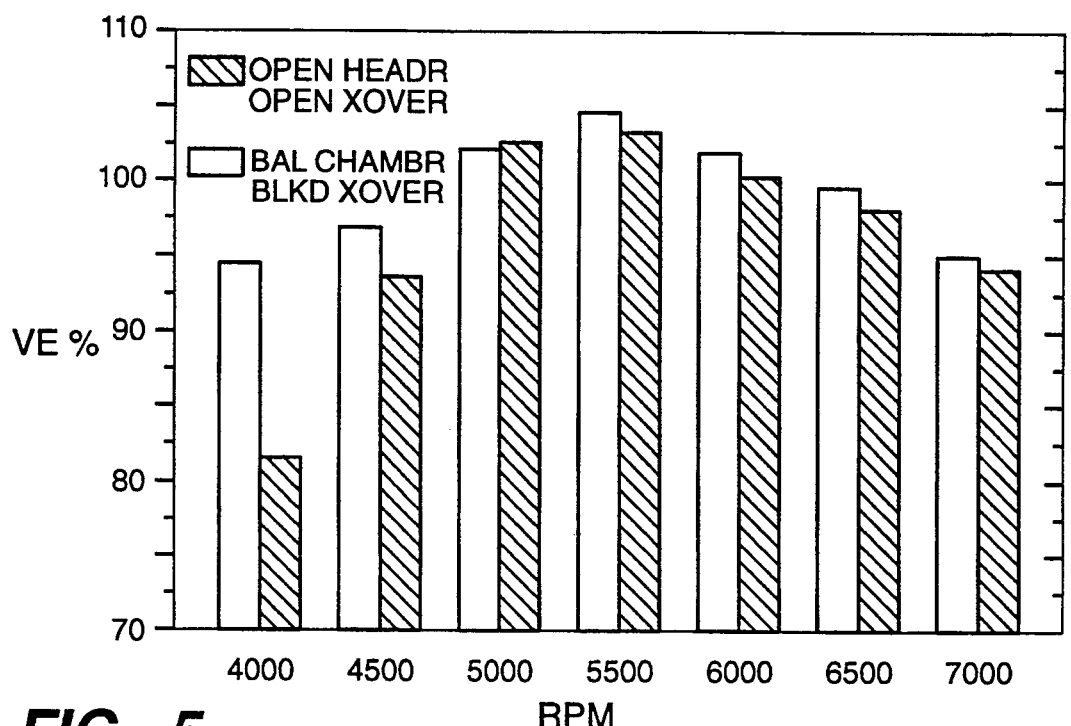
FIG._5
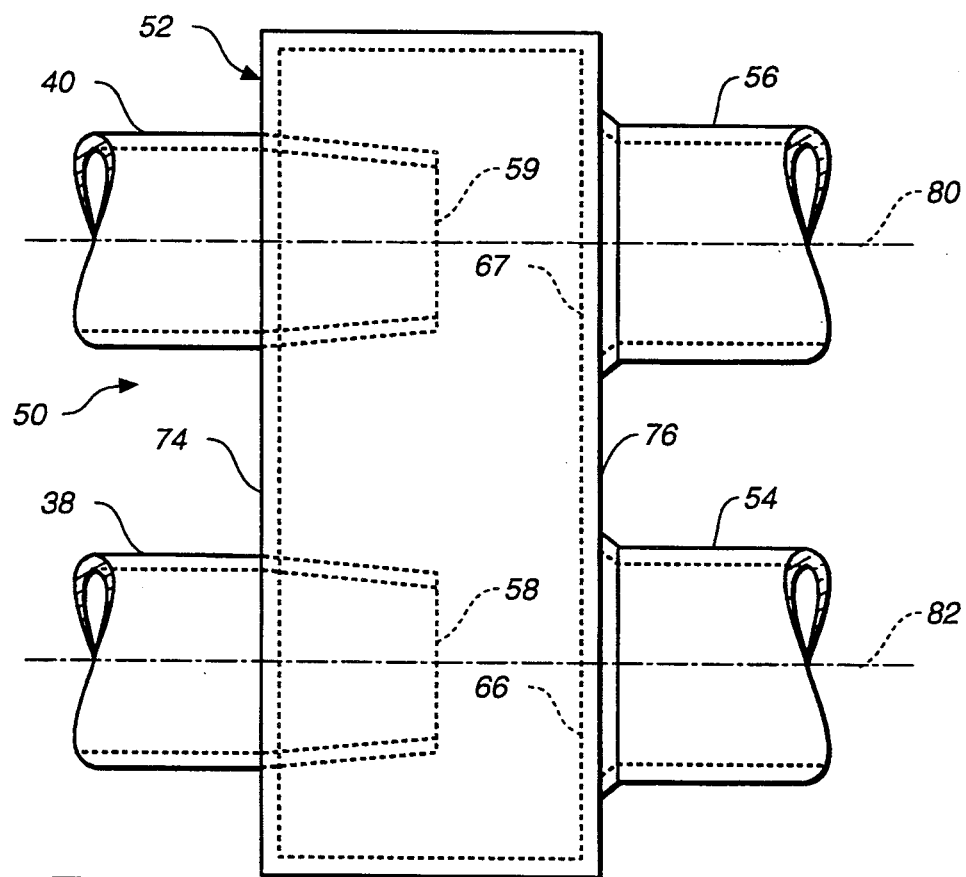
FIG._7

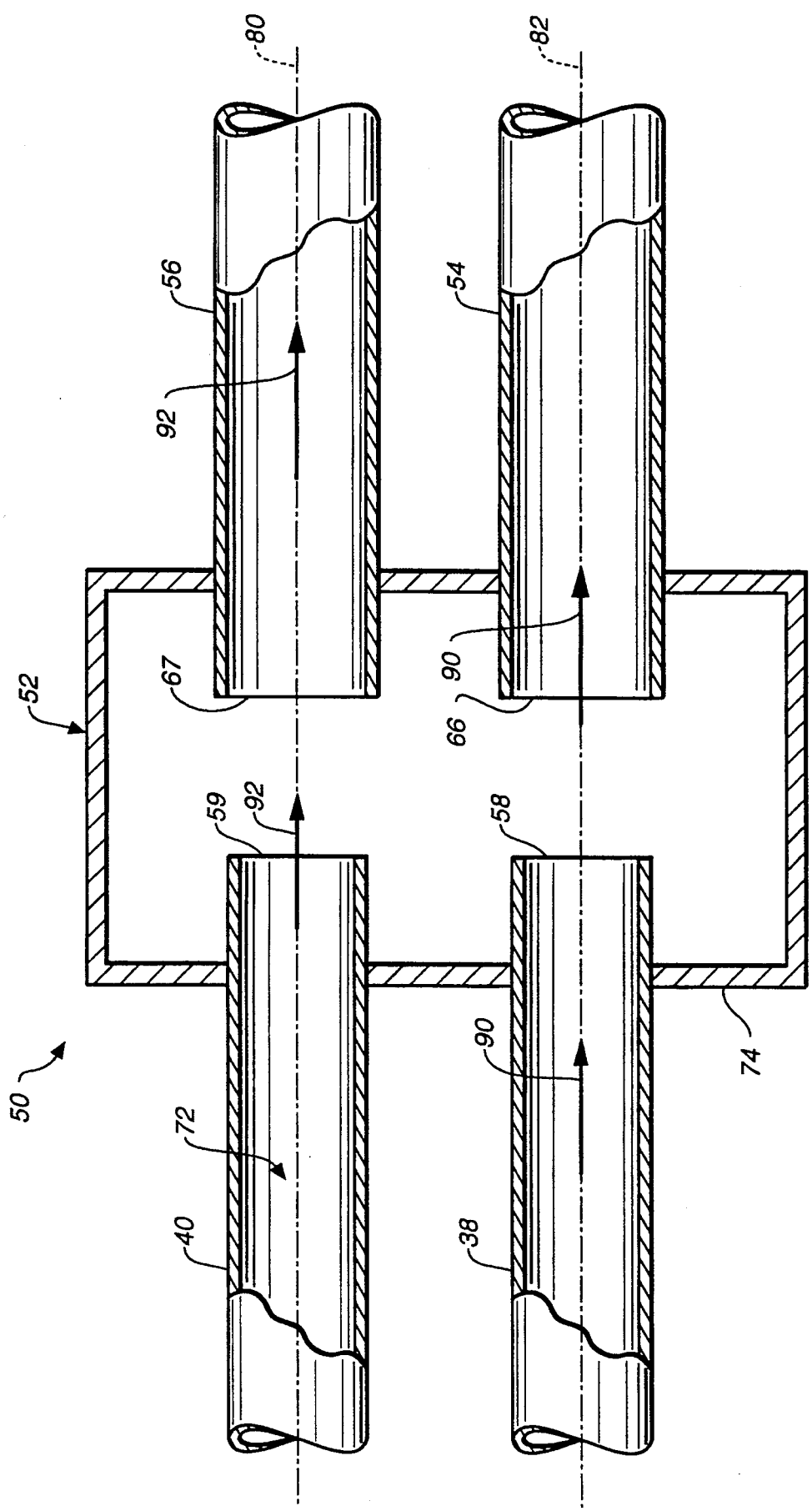
FIG._6

MUFFLER ASSEMBLY WITH BALANCED CHAMBER AND METHOD

The present invention relates to exhaust systems for internal combustion engines, and more particularly, relates to muffler assemblies of the type employed on high performance engines.

BACKGROUND OF THE INVENTION

Exhaust systems for high-performance internal combustion engines of the type used on racing cars have been the subject of considerable empirical design work and some theoretical studies. However, exhaust systems are often treated secondarily by racing teams and car manufacturers in the effort to increase engine performance. They generally are regarded as necessary evils which only contribute insignificantly to increase, and more conventionally are thought to decrease, engine horsepower.

Header exhausts form one portion of an exhaust assembly which are typically known to produce gains in horsepower. Because high performance engines are generally designed to rev at high speeds, a freer flowing exhaust is highly beneficial. Thus, headers improve exhaust flow while, further, beneficially reducing engine operating temperature.

Mufflers, on the other hand, with their internal baffling, ordinarily impede exhaust flow which increases back pressure. Typically, mufflers include sound attenuating partition configurations that baffle sound or disperse gas within the muffler. Some designs produce low pressure regions or volumes which can be the result of cancellation of identical sound frequencies by directing streams of gas to collide against each other, or can be the result of fluid flow patterns through the muffler, or both. However, such collisions of gas may induce back pressure, which generally reduces engine performance, or may increase operating temperature and reduces gas mileage. As such, mufflers are primarily used and developed for the attenuation of the sound component of an exhaust's gases from an internal combustion engine rather than applied to enhance engine performance.

The prior art contains various muffler constructions which purport to solve the problem of sound attenuation without producing the above-mentioned undesirable effects. Realistically, however, racing cars normally run straight pipes, eliminating the muffler.

At low engine speed, typically measured in revolutions per minute or RPM, a slight back pressure may aid acceleration and, thus, be beneficial. However, at a high RPM, back pressure is highly undesirable because it impairs breathing of the motor which limits the top speed. Sometimes, however, even in racing applications, mufflers are required.

As previously mentioned, some muffler designs produce a low pressure volume in the muffler chamber which has been found to be desirable since, in some muffler configurations, increases in horsepower have been measured.

Two mufflers which employ these principles and have been highly effective in sound attenuation while increasing engine horsepower are the muffler of my U.S. Pat. Nos. 4,574,914 and 5,123,502. These mufflers are now in widespread use by independent professional race car drivers and even by some of the manufacturer sponsored racing teams.

Other prior art mufflers which seek to effect sound attenuation while minimizing back pressure include: U.S. Pat. Nos. 624,062; 1,184,431; 1,081,348; 2,071,351; 2,325,905; 2,239,549; 2,485,555; 2,667,940; 2,971,599 and British Patent No. 285,604.

Recently, it has been found that exhaust header assemblies may be constructed that substantially increase horsepower. Such a header assembly is set forth in my pending U.S. patent application Ser. No. 07/566,983.

OBJECTS OF THE INVENTION

Accordingly, it is an object of the present invention to provide a muffler assembly for an internal combustion engine which is designed in a manner which measurably increases engine horsepower and torque over a wide range of engine operating speeds.

It is a still another object of the present invention to provide a muffler assembly and method for enhancing engine performance which can be predictably employed to significantly enhance engine performance at specific engine speeds.

It is another object of the present invention to provide a sound attenuating muffler which is compact, durable, has a minimum number of components and is economical to manufacture.

These and related objects may be achieved through the use of the muffler herein disclosed, which will produce significant increases of brake torque and brake horsepower in a wide range of operational speeds of the motor.

The muffler assembly of the present invention has other objects and features of advantage which will become apparent from, and are set forth in more detail in, the description of the best mode of carrying out the invention and the accompanying drawings.

DISCLOSURE OF THE INVENTION

The balanced chamber muffler assembly of the present invention comprises, briefly, a housing defining a chamber, a pair of inlet exhaust pipes coupled to the housing for discharge of out-of-phase exhaust gas into the chamber, and a pair of outlet exhaust pipes coupled to the housing for receipt of the exhaust gas from the chamber. Additionally, the inlet exhaust pipes and corresponding outlet exhaust pipes are spaced apart by an axial distance and are substantially axially aligned to cause the exhaust gas to flow through a portion of the chamber therebetween.

BRIEF DESCRIPTION OF THE DRAWING

FIG. 1 is a top plan, schematic view the of balanced chamber muffler assembly of the present invention mounted to an eight cylinder internal combustion engine having a header assembly mounted therebetween.

FIG. 2 is a top perspective view of a schematic representation of the muffler assembly designed in accordance with the present invention.

FIG. 3 is a graph illustrating the horsepower increase of an eight cylinder engine employing the muffler assembly of the present invention as compared to just an open header.

FIG. 4 is a graph illustrating the brake torque increase of the engine of FIG. 3 as compared to an open header.

FIG. 5 is a graph illustrating the volumetric efficiency increase of the engine of FIG. 3 as compared to an open header.

FIG. 6 is an enlarged, fragmentary, top plan view, partially broken away, of the muffler assembly of the present invention of the area bounded line 6—6 in FIG. 1.

FIG. 7 is an enlarged, top plan view, in cross section, corresponding to FIG. 6, of an alternative embodiment of a muffler assembly of the present invention.

FIG. 8 is a top perspective schematic view of another alternative embodiment of the muffler assembly of the present invention.

BEST MODE FOR CARRYING OUT THE INVENTION

Reference will now be made in detail to the preferred embodiments of the invention, examples of which are illustrated in the accompanying drawings. While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

Turning now to the drawings, wherein like components are designated by like reference numerals throughout the various figures, attention is directed to FIG. 1. Here is provided a muffler assembly which achieves the above-mentioned objectives. An internal combustion engine, generally designated 20, is here schematically shown as a V-8 engine having four pistons 22 per side. More specifically, FIG. 1 illustrates an internal combustion engine cylinder head having exhaust valves 24 and intake valves 26. There are various cylinder numbering and sequencing schemes, but typical of these schemes is the one employed by Ford in which the cylinders on one side of the engine are given the odd numbers, namely, 1, 3, 5 and 7, and the cylinders on the other side are given even numbers, namely, 2, 4, 6 and 8. Using this notation, the firing order as determined by the distributor (not shown) would typically be 1-8-4-3-6-5-7-2. The cylinder phasing is by 90°, keeping in mind the engine is a four cycle engine which would require one camshaft rotation to complete the cylinder firing sequence.

Mounted to exhaust ports on engine 20 are two symmetrical header assemblies 21 and 21a having primary header pipes 28-31 and 28a-31a. The discharge ends of header pipes 28-31 and 28a-31a are coupled to four primary collector assemblies, generally designated 32-35. In a similar fashion, these collectors converge into secondary collectors 36 and 37. It will be noted here that the headers shown in FIG. 1 may be formed as set forth for the header assembly of my pending U.S. patent application Ser. No. 07/566,983.

As clearly viewed in FIG. 1, collectors 36 and 37 are coupled to inlet pipes 38 and 40. The discharge ends of inlet pipes 38 and 40 are mounted to the balanced chamber muffler assembly of the present invention, generally designated 50. Briefly, assembly 50 comprises a chamber having two substantially parallel exhaust gas inlet pipes and two independent, respective, outlet pipes. Muffler assembly 50 may best be viewed in the perspective view of FIG. 2 in which a hollow or unobstructed chamber 52 is shown including a first wall 74 and an opposing second wall 76. Two inlet pipes 38 and 40 pierce first wall 74 and extend into chamber 52 in a substantially parallel fashion. These pipes preferably, although not necessarily, are of the same diameter.

Similarly, outlet pipes 54 and 56 are also independently mounted through second wall 76, may be of the same diameter as each other and extend into chamber 52. Further, outlet pipes 54 and 56 are substantially axially aligned with inlet pipes 38 and 40 along axes 80 and 82. Therefore, exhaust gases originating from alternating pistons of engine 20 travel through header assemblies 21 and 21a to muffler assembly 50 and out of the muffler assembly through outlet pipes 54 and 56.

In the broadest aspect of the present invention, the gases entering muffler 50 does not have to be discharged from out-of-phase cylinders, although such sequencing is preferred. If the chamber volume of muffler 50 between inlet pipes 38 and 40, and outlet pipes 54 and 56 is large enough, exhaust gas can be discharged into chamber 52 simultaneously from pipes 38 and 40. If there is a large enough volume for gases from both pipes to unobstructively flow, there will be some performance improvement. This effect, however, will not be as strong as when alternating out-of-phase cylinders are coupled to discharge gases into chamber 52.

Using the muffler assembly 50 of FIG. 6, very significant horsepower and torque increases have been achieved in racing engines that have been tuned by experts. FIGS. 3-5 represent a comparison of data taken from a 360 cc Ford V-8 engine coupled to an open header versus being coupled to the present invention's balanced chamber muffler. As clearly illustrated, substantial horsepower and torque increases are apparent in the mid engine speed ranges. i.e., 4000-5000 RPM. In the test engine developing 338 lb.-ft. of brake torque at roughly 4000 RPM, addition of the muffler assembly of the present invention increases torque 55 lb.-ft. or 16%. An increase in mid engine-speed torque is very useful when increased acceleration is desired. Even more impressive is the horsepower gain at 4000 RPM from 257 brake horsepower (Bhp) to nearly 300 Bhp or 17%. Another measure of performance increase is the volumetric efficiency which represents the intake volume of the combustion chambers as compared to maximum capacity at atmospheric pressure. As shown in FIG. 5, the balanced chamber muffler of the present invention produced a 13% volumetric efficiency gain at 4000 RPM. This results in a denser combustible gas in the combustion chamber which is reflected by the horsepower and torque increases. Moreover, at 4500 RPM, power increased by 18 Bhp or 6% while torque increased by 20 lb.-ft or 5.2%.

The Ford V-8 test engine was a racing engine which was required to have a fuel delivery system which restricted the top end performance of the engine. It is believed that an unrestricted volume carburetor would extend the performance increase experienced by using the present muffler into the upper RPM range. Such a horsepower and torque improvement in the higher RPM range is very beneficial to top speed performance.

As will be appreciated, a 43 horsepower increase in a racing engine output in the frequently used mid engine-speed range simply by changing the exhaust muffler is a very significant increase to the race car driver.

The sound attenuation using the present muffler was significantly greater than a straight pipe although no quantitative comparative sound measurements have been made.

As can be viewed in FIG. 6, exhaust gases will be discharged from the discharge end 58 of inlet pipe 38 into chamber 52, as indicated by arrow 90. Out-of-phase gases pass through inlet pipe 40 and enter chamber 52 in a forward fashion, as indicated by arrow 92 and along axis 80. As will be seen from FIG. 6, the distance between ends 58 and 59 of the inlet pipes and the ends 66 and 67 of the aligned outlet pipes is relatively short. Thus, most of the exhaust gases maintain its forward momentum in chamber 52 and travels substantially along axes 82 and 80, respectively. Accordingly, the majority of the gases directly enter their respective, axially aligned, outlet pipes 54 and 56, as opposed to travelling transversely in chamber 52 and entering the respective cross-outlet pipes. In other words, the majority of the volume of the gases is believed to directly pass through chamber 52 and out their respective outlet pipes without undue expansion and turbulence.

In the most preferred form of the present invention, the cross-sectional area of outlet pipes 54 and 56 is larger than the cross-sectional area of their respective inlet pipes 38 and 40. The slightly larger diameter accommodates some expansion of the gases as they travel through chamber 52. For instance, muffler assembly 50 coupled to the test motor included 3½ inch diameter inlet pipes 38 and 40, while the respective outlet pipes 54 and 56 are 4 inches in diameter.

Referring now to FIG. 7, an alternative embodiment of the present invention can be seen. A frusto-conical inlet pipe discharge ends 58 and 59 are shown extending partially into chamber 52. Discharge ends 58 and 59 gradually taper to create a slight Venturi effect which increases the speed of the exhaust pulses as they travel through the chamber 52. However, this convergence and velocity increase is slight. Moreover, the tapered end portions 58 and 59 have an interior surface free of indentations or ribbing so as not to constrain or confine the pulses discharged into chamber 52.

Also illustrated in FIG. 7, the entrances 66 and 67 of respective outlet pipes 54 and 56 may contain a bevel or gradually taper inwardly to again accommodate some expansion of the gases as they pass through chamber 52.

The shape of hollow chamber 52 is itself believed to be relatively insignificant. However, chamber 52 must be effectively sealed, except for the inlet openings 40 and 38 and outlet openings 54 and 56. Chamber 52 of FIG. 6 has advantageously been constructed with a length between walls 74 and 76 of about two times the diameter of the largest outlet exhaust pipe, a height of about four times the diameter of the largest outlet exhaust diameter, and a width (into the page in FIG. 6) of about two times the largest outlet exhaust pipe diameter.

As previously mentioned, it is preferable that gases enter chamber 52 from alternating out-of-phase cylinders. Accordingly, outlet pipes 54 and 56 must exit chamber 52 in a respective, axially aligned manner with inlet pipes 38 and 40. Preferably, the axial distance between the inlet discharge ends 58 and 59, and the outlet entrances 66 and 67 be no more than approximately two times the diameter of the largest of the two inlet exhaust pipe diameters. Best results seem to occur when the spacing is not less than about one times the diameter of the smallest inlet pipe diameter.

Similarly, the transverse distance between aligned axes 80 and 82 of inlet pipes 38 and 40 should be no greater than three times the diameter of the largest of the inlet pipe diameters. Too substantial a transverse distance will similarly erode the effect of the balanced chamber muffler.

Referring back to FIG. 2, in the preferred embodiment, both inlet pipe ends 58 and 59 and their respective linearly aligned outlet pipe entrances 66 and 67 extend into chamber 52 by not more than one-half of the largest an inlet pipe diameter. However, in the alternative, illustrated in FIG. 8, both inlet pipes 38 and 40, and axially aligned outlet pipes 54 and 56 may be mounted flushly to the end walls defining chamber 52. This design may be preferable when space limitations or the engine design dictates the chamber size. As can be seen, chamber 52 may be substantially thinner and more compact. In still another embodiment of the present invention, either the inlet pipe ends 58 and 59, or outlet pipe ends 66 and 67 may only extend into chamber 52 while the other is mounted flush to the end wall. FIG. 7 illustrates this configuration. Moreover, FIG. 7 clearly illustrates the gradual frusto-conical inlet discharge ends 58 and 59 of inlet pipes 38 and 40 into chamber 52.

While in the foregoing specification the present invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

Therefore, persons of ordinary skill in this field are to understand that all such equivalent structures are to be included within the scope of the following claims.

What is claimed is:

1. An exhaust assembly comprising:
    a housing defining a chamber;
    a pair of inlet exhaust pipes having substantially unobstructed openings coupled to said housing for discharge of exhaust gas into said chamber through said openings, said inlet exhaust pipes being formed for coupling to an internal combustion engine for receipt of said exhaust gas therefrom; and
    a pair of outlet exhaust pipes having substantially unobstructed openings coupled to said housing for receipt of said exhaust gas from said chamber;
    said inlet exhaust pipes and said outlet exhaust pipes being spaced apart in said chamber with said openings in said outlet exhaust pipes substantially axially aligned with said openings in said inlet exhaust pipes to cause said exhaust gas to flow from said inlet exhaust pipes over a length of said chamber to said outlet exhaust pipes, said chamber having a cross-sectional area in a plane transverse to said length and over the distance between said inlet exhaust pipes which is substantially greater in all directions radially of a transverse cross-sectional area of each of said inlet exhaust pipes, said chamber being substantially unobstructed between aligned openings for substantially unimpeded communication of exhaust gases between said inlet exhaust pipes and said outlet exhaust pipes and substantially unimpeded communication of momentum-induced low pressure between said inlet exhaust pipes.

2. An exhaust assembly as defined in claim 1 wherein, each of said outlet exhaust pipes has a transverse cross-sectional area slightly greater than the transverse cross sectional area of each of said inlet exhaust pipes.

3. An exhaust assembly as defined in claim 1 wherein, said pair of inlet exhaust pipes and said pair of outlet exhaust pipes being substantially parallel before entering said housing.

4. An exhaust assembly as defined in claim 1 wherein,
said openings of said inlet exhaust pipes each have an inlet exhaust pipe diameter, and
an axial distance between each inlet exhaust pipe and the respective axially aligned outlet exhaust pipe is less than about two times the diameter of the largest inlet exhaust pipe diameter.

5. An exhaust assembly as defined in claim 1 wherein,
said inlet exhaust pipes each have an inlet exhaust pipe diameter, and
an axial distance between each inlet exhaust pipe and the respective axially aligned outlet exhaust pipe is approximately one times the diameter of the largest inlet exhaust pipe diameter.

6. An exhaust assembly as defined in claim 1 wherein,
said inlet exhaust pipes each have an inlet exhaust pipe diameter, and
said inlet exhaust pipes and said outlet exhaust pipes are transversely spaced apart by not more than about three times the diameter of the largest inlet exhaust diameter.

7. An exhaust assembly as defined in claim 1 wherein,
said outlet exhaust pipes each have an outlet exhaust pipe diameter, and
said chamber is approximately two times the diameter of the largest outlet exhaust diameter in length, about four times the diameter of the largest outlet in height, and about two times the diameter of the largest outlet exhaust diameter in width.

8. An exhaust assembly as defined in claim 1 wherein,
said inlet exhaust pipes each have an inlet exhaust pipe diameter, and
each of said inlet exhaust pipes extend into said chamber by approximately one-half times the diameter of the largest inlet exhaust pipe diameter.

9. An exhaust assembly as defined in claim 1 wherein,
each of said outlet exhaust pipes has an outlet exhaust pipe diameter and extends into said chamber by approximately one-half times the diameter of the largest outlet exhaust pipe diameter.

10. An exhaust assembly as defined in claim 1 wherein,
each of said inlet exhaust pipes and of said outlet exhaust pipes extends into said chamber by approximately one-half of their respective diameters.

11. An exhaust assembly as defined in claim 1 wherein,
said inlet exhaust pipes are inwardly tapered in the direction of exhaust gas flow proximate discharge of said exhaust gas into said chamber.

12. An exhaust assembly as defined in claim 2 wherein,
said outlet exhaust pipes are inwardly tapered in the direction of exhaust gas flow proximate receipt of exhaust gas from said chamber.

13. An exhaust assembly as defined in claim 1 wherein,
said inlet exhaust pipes are coupled to receive said exhaust gas from alternating out-of-phase cylinders of an internal combustion engine.

14. A method of increasing horsepower in an internal combustion engine comprising the steps of:
coupling a pair of inlet exhaust pipes connected to out-of-phase cylinders of said engine to a hollow exhaust assembly housing in side-by-side parallel relation for discharge of exhaust gas into said housing, and
coupling a pair of outlet exhaust pipes to said housing in substantial axial alignment with said inlet exhaust pipes, said outlet exhaust pipes being mounted proximate and in axially spaced relation in said housing to said inlet exhaust pipes for flow of a majority of the exhaust gas from the inlet exhaust pipes through said chamber and out the outlet exhaust pipes, said housing having a cross-sectional area in a transverse plane to exhaust gas flow between said inlet exhaust pipes and said outlet exhaust pipes over the distance between said inlet exhaust pipes substantially greater in all directions radially of a transverse cross-sectional area of each of said inlet exhaust pipes, and said housing and said inlet exhaust pipes and said outlet exhaust pipes are formed for substantially unimpeded flow of exhaust gases from said inlet exhaust pipes to said outlet exhaust pipes.

15. An exhaust assembly comprising:
a housing defining a chamber;
a pair of inlet exhaust pipes coupled to said housing for discharge of exhaust gas into said chamber formed for coupling to an internal combustion engine for receipt of said exhaust gas therefrom; and
a pair of outlet exhaust pipes coupled to said housing for receipt of said exhaust gas from said chamber, each of said outlet exhaust pipes having a transverse cross-sectional area slightly greater than the transverse cross sectional area of each of said inlet exhaust pipes; and
said inlet exhaust pipes and said outlet exhaust pipes being spaced apart in said chamber and being axially aligned to cause said exhaust gas to flow from said inlet exhaust pipes through a portion of said chamber to said outlet exhaust pipes, and said outlet exhaust pipes being inwardly tapered in the direction of exhaust gas flow proximate receipt of exhausts gas from said chamber.

16. An exhaust assembly comprising:
a housing defining a chamber;
a pair of inlet exhaust pipes having substantially unobstructed openings coupled to said housing for discharge of exhaust gas into said chamber through said openings, said inlet exhaust pipes being formed for coupling to an internal combustion engine for receipt of said exhaust gas therefrom; and
a pair of outlet exhaust pipes having substantially unobstructed openings coupled to said housing for receipt of said exhaust gas from said chamber, each of said outlet exhaust pipes has a transverse cross-sectional area slightly greater than the transverse cross sectional area of each of said inlet exhaust pipes;
said inlet exhaust pipes and said outlet exhaust pipes being spaced apart in said chamber with said openings in said outlet exhaust pipes substantially axially aligned with said openings in said inlet exhaust pipes to cause said exhaust gas to flow from said inlet exhaust pipes over a length of said chamber to said outlet exhaust pipes, said chamber having a cross-sectional area in a plane transverse to said length and over the distance between said inlet exhaust pipes which is substantially greater than said transverse cross-sectional area of each of said inlet exhaust pipes, said chamber being substantially unobstructed between aligned openings for substantially unimpeded communication of exhaust gases between said inlet exhaust pipes and said outlet exhaust pipes and substantially unimpeded communication of momentum-induced low pressure between said inlet exhaust pipes.

* * * * *